July 7, 1970   F. W. KELLEY, JR   3,519,915
HIGH-FREQUENCY SINE-WAVE STATIC INVERTER
Filed Feb. 12, 1968
Fig. 1.
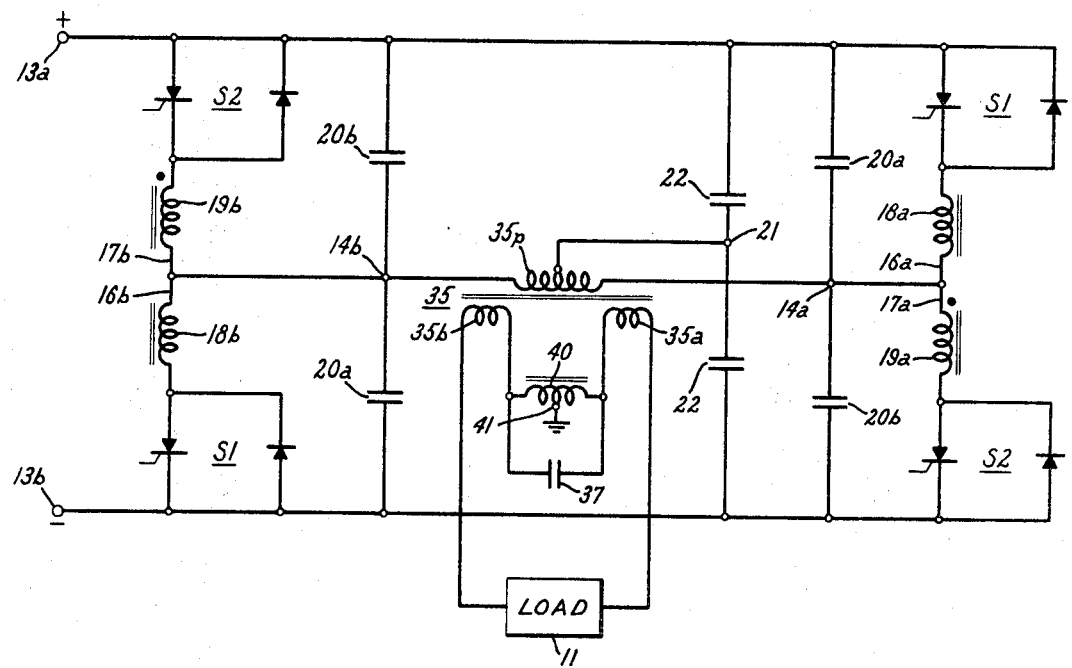
Fig. 2.
Fig. 3.
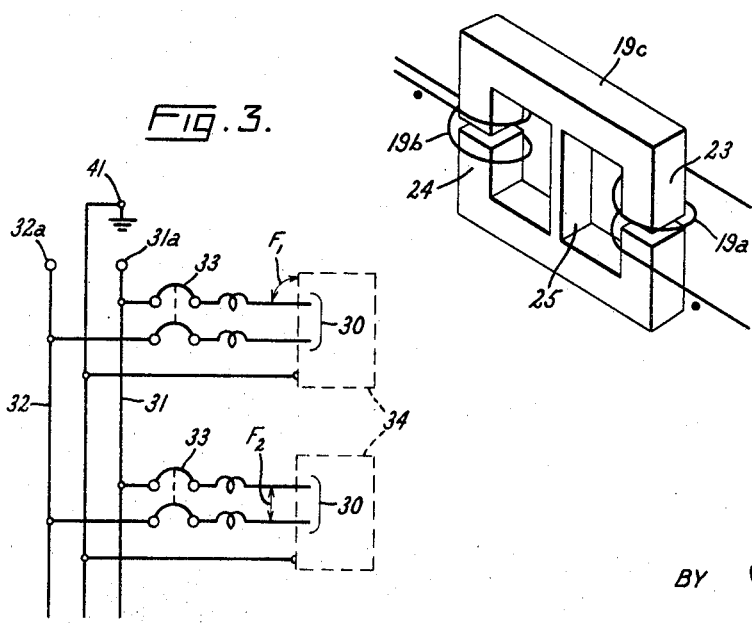
INVENTOR:
FRED W. KELLEY, JR.
BY Albert S. Richardson Jr.
ATTORNEY

United States Patent Office 3,519,915
Patented July 7, 1970

3,519,915
HIGH-FREQUENCY SINE-WAVE STATIC INVERTER

Fred W. Kelley, Jr., Media, Pa., assignor to General Electric Company, a corporation of New York
Filed Feb. 12, 1968, Ser. No. 704,914
Int. Cl. H02m 1/18; H02h 7/12
U.S. Cl. 321—14                                            12 Claims

ABSTRACT OF THE DISCLOSURE

In an electric power inverter designed to supply an A-C load from a D-C source, wherein the load is paralleled by a capacitor and coupled by a transformer to the source via alternately triggered bidirectionally conducting switching elements having separate inductors respectively in series therewith to form a complementary pair of resonant circuits each tuned to a frequency higher than (but less than twice) the operating frequency of the switching elements, an autotransformer is added between dual output windings of the load transformer. In an embodiment where the switching elements are arranged in a bridge configuration employing mutually coupled inductance coils in each output current path, a ferromagnetic shunt of relatively small cross-sectional area is provided in the window of the core on which the coils are respectively disposed.

---

My invention relates to static inverters of the kind disclosed in U.S. Pat. 3,242,415. The manner of making such inverters, their mode of operation, and their advantages have been fully described in a copending application Ser. No. 459,225—Mapham et al., filed May 27, 1965, and assigned to the General Electric Company (now U.S. Pat. 3,406,327). The referenced application itself relates to certain improved features of such inverters, and the present application is addressed to additional improvements therein.

Inverters of the kind contemplated herein are useful for supplying high-frequency sine wave A-C electric power to connected loads such as fluorescent lights or induction heating apparatus. With a lighting load in particular, there is a possibility of line-to-line or line-to-ground short circuits occurring in any one of a plurality of parallel load branches. Preferably the inverter should continue operating while such a fault is cleared by localized protective means in the affected branch, whereby the sound branches are not unnecessarily deenergized. Accordingly, one objective of the present invention is to provide an inverter circuit capable of operating in this desired fashion.

Another objective is the improvement of prior art inverters respecting their reliability in the event of load faults and respecting their insensitivity to transient disturbances.

Yet another objective is to reduce the cost and to improve the performance of an electric power inverter having a well regulated, generally sinusoidal output voltage.

In carrying out my invention in one form, the output terminals of the inverter are spanned by the input winding of a transformer having dual output windings between which an autotransformer is disposed. The autotransformer windings have equal turns and share a common terminal which is grounded. They are individually connected to the dual output windings, and the load circuit supplied by the inverter is connected across both output windings. The autotransformer is shunted by series-capacitor compensating means.

Preferably the static switching elements of the inverter are connected in a bridge configuration and are operated at a relatively high predetermined frequency, such as 3,333 Hertz. The no-load resonant frequency of each of the two series resonance circuits (comprising inductance in series with the respective switching elements and capacitance in parallel with the load circuit) is selected to be approximately 1.65 times said predetermined frequency. In accordance with the teachings of the previously cited copending patent application of Mapham et al., the paired inductance elements in each resonance circuit are mutually coupled, and in accordance with my present invention, the common core for these elements comprises two legs of approximately equal cross sectional dimensions and a bridge of substantially smaller cross sectional area disposed in shunt therewith.

My invention will be better understood and its various objects and advantages will be more fully appreciated from the following description taken in conjunction with the accompanying drawing in which:

FIG. 1 is a schematic circuit diagram of an electric power inverter embodying my improvements;

FIG. 2 is a simplified representation of a magnetizable core constructed in accordance with a preferred form of my invention; and FIG. 3 is a schematic diagram of a typical load circuit that can be advantageously energized by my improved inverter.

Referring now to FIG. 1, a static inverter is shown for converting electric power from direct to alternating form. The inverter is provided with a set of two D-C input terminals 13a and 13b that are adapted to be respectively energized by the relatively positive and negative poles of any suitable source of direct current, and it has a set of A-C output terminals 14a and 14b that are spanned by the input winding 35p of a load transformer 35 whose secondary is connected in turn to a single-phase alternating current load circuit 11.

The input and output terminals of the illustrated inverter are internally interconnected by means including a first alternating current-conducting path having two serially related sections 16a and 16b and a second or complementary alternating current-conducting path having two serially-related sections 17a and 17b. As can be seen in FIG. 1, the section 16a is formed by a switching element S1 in series with an inductance element 18a, and it is connected from the relatively positive input terminal 13a to the first output terminal 14a. The companion section 16b, including another switching element S1 in series with a similar inductance element 18b, is connected from the second output terminal 14b to the relatively negative input terminal 13b. The section 17a of the second path, which section is formed by a switching element S2 in series with an inductance element 19a, is connected from the relatively negative input terminal 13b to the inverter output terminal 14a, while the companion section 17b, including a duplicate switching element S2 in series with yet another inductance element 19b, is connected from the second output terminal 14b to the positive terminal 13a.

In the above-described bridge configuration, when both of the switching elements S1 are in their conducting states, the first path 16a, 16b will enable source current from the input terminals, 13a, 13b to flow in a given "forward" direction with respect to the transformer winding 35p that spans the inverter output terminals 14a, 14b. On the other hand, when both switching elements S2 are conducting, the second path 17a, 17b enables source current to flow in the opposite or "reverse" direction with respect to the transformer winding 35p. To minimize harmonic displacement between the voltage impressed on winding 35p and the source voltage, this winding is provided with a center tap which is connected to the midpoint 21 of a series string of two or more capacitors 22 connected across the D-C input terminals 13a and 13b as shown.

In each of the complementary paths 16 and 17 there is a total inductance of L henries divided equally between the inductance elements respectively located in the two duplicate sections of that path. To complete the inverter circuitry, a capacitance of C farads is connected in parallel circuit relationship with the load that is connected across the output terminals 14a and 14b. This capacitance could be in the form of either a single capacitor bank of C farads connected between terminals 14a and 14b, or, as is shown in FIG. 1, an equivalent arrangement of two pairs of smaller capacitors 20a and 20b, each having a capacitance value of 0.5C farads, with the capacitors 20a being respectively connected across the two sections 16a and 16b of the first alternating current-conducting path and the capacitors 20b being respectively connected across the two sections 17a and 17b of the complementary path.

By suitably controlling the operations of the bidirectionally conducting switching elements S1 and S2 in the respective paths 16 and 17, and by selecting the parameters of reactive elements 18–20 in the manner explained below, the illustrated inverter will operate to develop at its output terminals an alternating voltage of generally sinusoidal wave form over a relatively wide range of load variations between no load (essentially open circuit) and full load (minimum connected load impedance) conditions.

In the mode of operation herein contemplated, the switching elements S1 in the respective section 16a and 16b that comprise the aforesaid first path are both switched simultaneously, at a predetermined operating frequency $f_i$, from non-conducting (high impedance) to conducting (negligible impedance) states. Both of the switching elements S2 in the respective sections 17a and 17b of the second path are switched to conducting states midway between successive operating points of S1. The series resonance circuit formed by a parallel combination of two capacitors 20a and 20b in series with the two inductance elements 18a and 18b (or 19a and 19b) when only one of the complementary paths is conducting is tuned so that its no-load resonant frequency $$f_0 \left( \frac{1}{2\pi\sqrt{LC}} \right)$$

is between one and two times the operating frequency $f_i$. Thus each path will conduct an oscillatory current having a period that is shorter than $1/f_i$ but longer than $1/2f_i$. The respective switching elements S1 and S2 are each arranged to revert to a non-conducting state after an interval of conduction just equal to the period of a full cycle of this oscillatory current.

With the operating mode described in the preceding paragraph, reverse current will already be flowing in the first path 16a, 16b at the moment the switching elements S2 of the complementary path 17a, 17b are switched to conducting states, and, similarly, forward current will be flowing in the latter path at the moment that the switching elements S1 of the first path are switched to their conducting states. Consequently, for some finite portion of each half cycle of inverter operation, the conducting periods of the two paths overlap, and throughout this overlap the individual oscillatory currents are in directional agreement. The sum of the currents in the respective paths is supplied to the input winding 35p of the load transformer in combination with its parallel capacitance means. For more information concerning this operating mode and its advantages, refer to the Mapham et al. application that was cited hereinbefore.

The bidirectionally conducting switching elements S1 and S2 can be of any suitable construction capable of operating in the prescribed manner. For purposes of illustration each switching element is shown as a solid-state controlled rectifier shunted by an oppositely-poled auxiliary load-current carrying power diode. The controlled rectifier can be switched to a conducting state (turned-on) by energizing its gate electrode with a gate pulse. Any suitable trigger circuit can be used to produce a succession or train of gate pulses for alternately turning on the respective controlled rectifiers of the switching elements S1 and S2 at the predetermined operating frequency $f_i$. Typical circuits for this purpose are disclosed in Chapter 5, pages 190–247 of Semiconductor Controlled Rectifiers by F. E. Gentry et al. (Prentice-Hall, Englewood Cliffs, N.J., 1964). Once triggered, each controlled rectifier will remain on until the end of the first loop of oscillatory current in the associated path, and commutation takes place while the parallel diode conducts the succeeding oppositely-poled loop.

Those skilled in the art will appreciate that for relatively high current or voltage ratings of the inverter a plurality of simultaneously operated controlled rectifiers can be disposed in parallel or in series with each other in each of the switching elements S1 and S2. Fewer auxiliary diodes than controlled rectifiers could be used in each switching element if desired. In order to limit the maximum time rate of rise of voltage across each of the switching elements S1 and S2 when the auxiliary diode of that element stops conducting, it is desirable to connect in shunt with each element a $dv/dt$ suppression circuit known as a "snubber" an improved form of which is the subject matter of copending patent application S.N. 662,642—Kelley et al., filed Aug. 23, 1967, and assigned to the General Electric Company.

So long as the two switching elements S1 are operated in unison, both of the inductance elements 18a and 18b that are associated with the first path 16a, 16b will carry the same current and will generate similar voltages simultaneously. The same is true of the two inductance elements 19a and 19b in the complementary path 17a, 17b. Therefore, in accordance with the teachings of the previously cited Mapham et al. application, the four separate inductance elements can be combined into two independent pairs of mutually coupled inductors. Each pair employs the mutual inductance between its two parts to engender the required inductance value (L), whereby the individual inductance of each of the respective elements can be reduced from 0.5L to 0.25L. This advantageously minimizes the size of these components and thus reduces costs.

FIG. 2 illustrates a preferred way to accomplish the magnetic coupling between elements 19a and 19b. It will be understood that the structure of the other pair 18a and 18b is the same. In FIG. 2 the two elements 19a and 19b are shown as multiturn coils disposed on a common core 19c of magnetizable material. The core 19c has two legs 23 and 24 of approximately equal cross sectional dimensions, and each leg has a short air gap disposed centrally therein. The coil 19a encircles the leg 23 and embraces the air gap therein. The coil 19b encircles the leg 24 whose air gap it embraces. In accordance with my invention, the two legs 23 and 24 of the core 19c are shunted by a ferromagnetic bridge 25 of substantially smaller cross sectional area. By "substantially smaller" I mean less than approximately one-fifth the leg area. In practice I have found that one-tenth the area will suffice. The purpose of the bridge 25 will now be explained.

Although simultaneously triggered, the controlled rectifiers used in the two duplicate sections 17a and 17b of the same path are not likely to exhibit precisely the same switching characteristics. More specifically, one of the switching elements S2 may have a slightly longer turn-on time than the other. Such asymmetrical operation of the switching elements tends undesirably to distort the waveform of the inverter output voltage and to unbalance the voltage distribution on the controlled rectifiers. Tending to aggravate this asymmetry is the fact that until the slower controlled rectifier begins to conduct, only one-half the total turns of the coils 19a and 19b is effective. Consequently there is a subnormal amount of inductance in series with the first-on rectifier, and its anode current can rise at an excessive rate.

To correct this condition and assure proper values of inductances in spite of asymmetrical operation of the switching elements, I added the above-described bridge 25. The bridge 25 provides a preferred path for whatever magnetic flux difference exists between the two coils 19a and 19b. Whenever only one of the companion switching elements is conducting, the bridge shunts one of the two air gaps and in the legs 23 and 24 and thereby temporarily doubles the value of inductance that the coil associated with the conducting element would otherwise exhibit. Since the bridge is only required to accommodate the difference flux, which, in the worst case, is much less than the flux generated when the coils 19a and 19b are conducting peak full load current, its area can be relatively small.

FIG. 3 symbolically depicts a typical load circuit 11 for the FIG. 1 inverter. A plurality of A-C electric power utilizing loads 30 are connected in parallel to a distribution system comprising two lines 31 and 32 having terminals 31a and 32a which in turn are adapted to be connected, via the load transformer 35, to the inverter output terminals 14a and 14b. The connected load impedance is assumed to be characterized by an approximately 0.7 leading power factor. Following the teachings of the previously cited Mapham et al. application, capacitor compensating means 37 (see below) is included in series with the load, whereby the magnitude of the voltage applied to the terminals 31a and 32a of the load circuit remains nearly constant over a wide range of load variations.

As can be seen in FIG. 3, the respective loads 30 are individually located in grounded fixtures 34 and are electrically connected to the lines 31 and 32 by means of 2-pole circuit protectors 33. Each circuit protector 33 is capable of automatically opening (clearing) the branch circuit in which it is connected, thereby disconnecting the associated load from the distribution system, in delay response to abnormally high current flowing therethrough. Abnormally high current might be the result of a line-to-ground fault, as indicated at $F_1$ in FIG. 3, or a line-to-line fault as indicated at $F_2$. In either event, inverter operation should be immune to such disturbances so that the branches of the distribution system remaining sound are not unnecessarily deenergized.

In accordance with my invention, the reliability of the inverter during line-to-ground fault conditions ($F_1$) has been improved by dividing the output side of the load transformer 35 into two identical but separate windings 35a and 35b and by conductively connecting these dual output windings to the load terminals 31a and 32b in series circuit relationship with one another and with an autotransformer 40 disposed therebetween. The autotransformer 40, which is shown in FIG. 1, is provided with primary and secondary windings of approximately equal turns and a common terminal 41. As can be seen in FIGS. 1 and 3, the common terminal 41 is grounded to establish a grounded neutral for the load distribution system. One of the autotransformer windings is connected to the output winding 35a of the transformer 35, and the other is connected to the output winding 35b. A capacitor 37, which comprises the above mentioned series-capacitor compensating means, is connected between the output windings 35a and 35b in shunt with the autotransformer 40.

The function of the autotransformer 40 is to control the magnitude of ground current on the occasion of a faul $F_1$ so that inverter commutation will not be inhibited. Consequently the inverter can continue to operate while the involved branch protector 33 is responding to the fault and clearing the same. The leakage inductance of the autotransformer windings is relied on to limit line-to-ground current. The valve of this parameter is selected to prevent load current from exceeding the permissible overload capabilities of the inverter when a ground fault $F_1$ occurs, while nevertheless permitting current to increase sufficiently above normal in the faulted branch of the load to activate the local protector 33. It will be observed that the normal resonant frequency $f_0$ of the inverter circuit tends to change slightly during a line-to-ground fault condition due to the autotransformer leakage inductance being then imposed in series with the compensating capacitor 37.

In the event of a line-to-line fault condition ($F_2$), the load terminals 31a and 32a become short circuited, and in essence the only load impedance presented to the output terminals of the inverter is that of the compensating capacitor 37. Consequently the amount of capacitance in series with the inductances in the respective resonance circuits of the inverter is materially increased. This can immediately depress the resonant frequency $f_0$ by a factor approaching one-half, thereby jeopardizing operation of the inverter before the involved protector 33 has time to disconnect the faulted branch of the load. To avoid premature failure (shoot through) of the inverter in such circumstances, I tune the resonance circuits to a no-load resonant frequency $f_0$ that is approximately 1.65 times the operating frequency $f_1$ of the inverter. As a result, the ratio of $f_0$ to $f_1$ will remain above approximately 0.8 on the occasion of the described fault $F_2$, which ratio is nearly the minium practical value at which the inverter switching elements remain able reliably to commutate the fault current.

The 1.65 ratio of $f_0$ to $f_1$ is higher than the 1.35 ratio specified in the previously cited Mapham et al. application, and it is employed at the expense of a larger harmonic content in the output voltage waveform. However, this degeneration in the sinusoidal character of the voltage waveform is offset by a number of advantages. The higher ratio promotes reliability under the abnormal circumstances explained above. In addition, it reduces the transient response time of the inverter in the event of certain expectable disturbances. For example, when my inverter is started, either unloaded or fully loaded, its current and voltage waveforms will attain their normal, steady-state conditions within the first cycle of output voltage. Furthermore, when my inverter is operating unloaded and at maximum voltage, load current and voltage waveforms will attain steady-state conditions in less than 1.5 cycles following the application of full load.

For a given operating frequency and a given output voltage magnitude, the higher ratio of $f_0$ to $f_1$ also reduces the average magnitude of current in the controlled rectifiers of the switching elements S1 and S2 and reduces the stepped magnitude of forward voltage that is abruptly applied to each controlled rectifier when its parallel diode periodically stops conducting. By using the ratio of 1.65, the latter voltage will be reduced, under no load, steady-state conditions, to a level which is less than 70 percent of that obtained at ratio of 1.35. This results in a significant gain in efficiency because electric power losses in the snubber circuits connected across the switching elements S1 and S2 increase at a rate greater than the second power of the stepped voltage magnitude.

While I have shown and described a preferred form of my invention by way of example, many modifications will undoubtedly occur to those skilled in the art. For example, the benefits attributed to the autotransformer 40 can be realized in conjunction with other inverter circuits employing series capacitive compensation or capacitive coupling to the load. I therefore contemplate by the concluding portion of this specification to cover all such modifications as fall within the true spirit and scope of my invention.

What I claim as new and desire to secure by United States Letters Patent is:

1. An improved electric power inverter comprising a set of D-C input terminals adapted to be connected to a source of direct current, a set of A-C output terminals adapted to be connected to an alternating current load circuit, alternately triggered switching elements interconnecting said input and output terminals, capacitance means connected effectively in parallel with the load circuit, and separate inductors respectively connected in series with said switching elements to form with the capacitance means a complementary pair of resonance circuits each of which is tuned to a frequency that is between one and two times the frequency at which said elements are triggered, wherein the improvement comprises:
  (a) a transformer having an input winding and two identical but separate output windings, said input winding spanning the output terminals of the inverter; and
  (b) conductive means for connecting both output windings and the load circuit in series circuit relationship with one another;
  (c) said conductive means including an autotransformer having primary and secondary windings of approximately equal turns and having a common terminal which is grounded, said autotransformer being disposed between said output windings with said primary winding connected to one of said output windings and said secondary winding connected to the other output winding.

2. The improved inverter of claim 1 in which a capacitor is connected between said output windings in shunt with said autotransformer.

3. The improved inverter of claim 1 in which said input winding has a center tap which is connected to the midpoint of a series string of capacitors connected across the D-C input terminals of the inverter.

4. The improved inverter of claim 3 in which a compensating capacitor is connected between said output windings in shunt with said autotransformer.

5. In combination with an electric power inverter having a set of D-C input terminals adapted to be connected to a source of direct current and a set of A-C output terminals adapted to be connected to an alternating current load circuit which includes overcurrent responsive protective means in series therewith:
  (a) a transformer having an input winding and two identical but separate output windings, said input winding spanning the output terminals of the inverter;
  (b) conductive means for connecting both output windings to the load circuit in series circuit relationship with one another;
  (c) said conductive means including an autotransformer having primary and secondary windings of approximately equal turns and having a common terminal which is grounded, said autotransformer being disposed between said output windings with said primary winding being connected to one of said output windings and said secondary winding connected to the other output winding; and
  (d) a capacitor connected between said output windings in shunt with said autotransformer.

6. An improved electric power inverter comprising relatively positive and negative input terminals adapted to be energized by D-C electric power, first and second output terminals adapted to be connected to an A-C load, capacitance means connected effectively in parallel circuit relationship with said output terminals, and complementary first and second alternating current-conducting paths, each path including two switching elements and a pair of inductance elements disposed on a common magnetizable core, said first path being divided into two duplicate sections which respectively connect said positive input terminal to said first output terminal and said second output terminal to said negative input terminal and said second path being divided into two duplicate sections which respectively connect said positive input terminal to said second output terminal and said first output terminal to said negative input terminal, each pair of inductance elements forming, in series with said capacitance means, a resonance circuit tuned to a frequency between one and two times the frequency at which the respective switching elements of said first and second paths are alternately switched from non-conducting to conducting states, wherein the magnetizable core for each pair of inductance elements comprises:
  (a) two legs of approximately equal cross sectional dimensions, each of said legs having an air gap and each having individually associated therewith a different one of the two inductance elements of the corresponding pair; and
  (b) a bridge of substantially smaller cross sectional area disposed in shunt with said legs, whereby said bridge provides a path for whatever magnetic flux difference may exist between said inductance elements.

7. The improved inverter of claim 6 in which each pair of inductance elements comprises first and second coils of approximately equal turns, said first coil encircling one of said legs of said common core and embracing the air gap therein, and said second coil encircling the other leg of said core and embracing the air gap therein.

8. The improved inverter of claim 6 in which said output terminals are connected to the load by means of the following components:
  (c) a transformer having an input winding and dual output windings, said input winding being connected between said first and second output terminals; and
  (d) conductive means for connecting both output windings of said transformer and the load in series circuit relationship with one another;
  (e) said conductive means including an autotransformer having primary and secondary windings of approximately equal turns and having a common terminal which is grounded, said autotransformer being disposed between said output windings with said primary winding connected to one of said output windings and said secondary winding connected to the other output winding.

9. The improved inverter of claim 8 in which each resonance circuit is tuned to a frequency approximately 1.65 times the switching frequency of said switching elements.

10. The improved inverter of claim 6 in which each resonance circuit is tuned to a frequency approximately 1.65 times the switching frequency of said switching elements.

11. In an electric power inverter:
  (a) a set of D-C input terminals adapted to be connected to a source of direct current;
  (b) a pair of A-C output terminals adapted to be connected to an alternating current load by means of the following circuit components:
    (b1) a transformer having an input winding and dual output windings, said input winding spanning the output terminals of the inverter; and
    (b2) conductive means for connecting both output windings of said transformer and the load in series circuit relationship with one another;
    (b3) said conductive means including an autotransformer having primary and secondary windings of approximately equal turns and having a common terminal which is grounded, said autotransformer being disposed between said output windings with said primary winding connected to one of said output windings and said secondary winding connected to the other output winding;
  (c) capacitance means of C farads connected effectively in parallel circuit relationship with said output terminals; and (d) means for electrically interconnecting said input and output terminals, said interconnecting means including paths with each of said paths including independent inductance means of L henries in series with bidirectionally conducting switching means, said first path being disposed to enable source current to flow in a given forward direction with respect to said output terminals and said second path being disposed to enable source current to flow in a reverse direction with respect to said output terminals;

(e) the respective switching means of said first and second paths being alternately switched, at a predetermined operating frequency, from a non-conducting state to a conducting state and being arranged after conducting a full cycle of oscillatory current to revert to said non-conducting state;

(f) the magnitude of C and L being selected so that the quantity $$\frac{1}{2\pi\sqrt{LC}}$$

is approximately 1.65 times said predetermined operating frequency.

12. The inverter of claim 11 in which capacitor compensating means is coupled to said output terminals in series circuit relationship with the load.

References Cited

UNITED STATES PATENTS

| | | | |
|---|---|---|---|
| 1,918,870 | 7/1933 | Sabbah | 321—36 X |
| 2,009,788 | 7/1935 | Sabbah | 321—36 |
| 3,303,406 | 2/1967 | Bedford | 321—45 X |
| 3,406,327 | 10/1968 | Mapham et al. | 321—45 |
| 3,414,797 | 12/1968 | Morgan | 321—44 X |

LEE T. HIX, Primary Examiner

W. H. BEHA, JR., Assistant Examiner

U.S. Cl. X.R.

321—45